Jan. 8, 1929.
G. FROVA
1,698,476
FRUIT PITTING AND PEDUNCLE REMOVING MACHINE
Filed Dec. 20, 1926 4 Sheets-Sheet 1
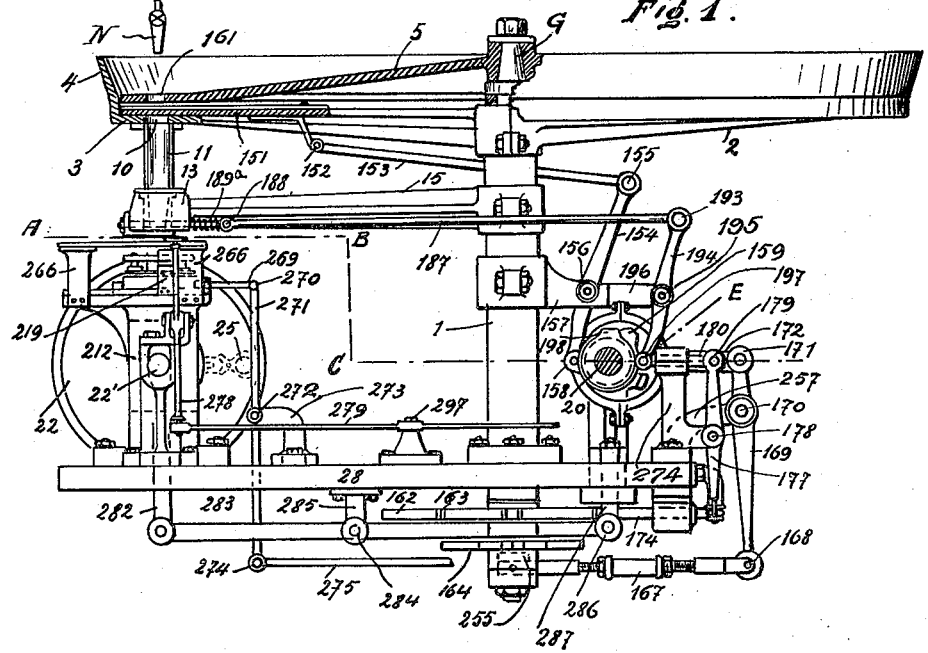
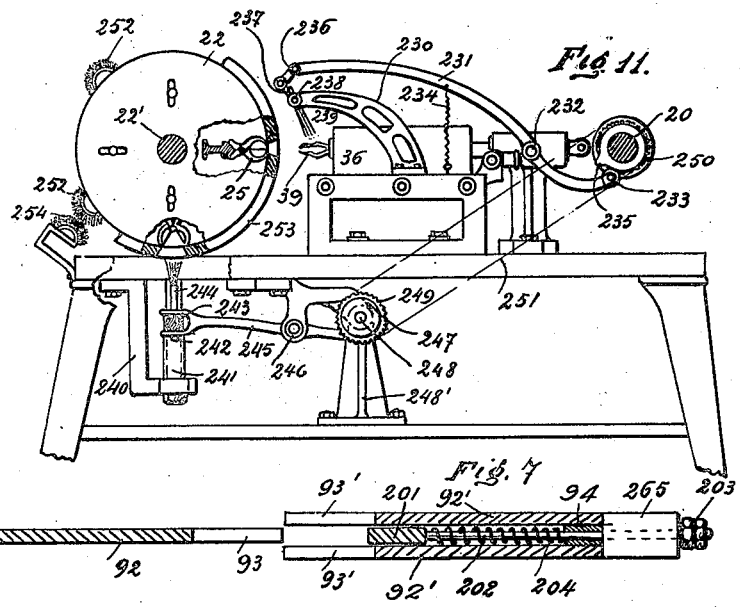
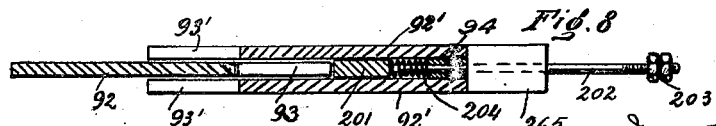
Inventor
Giovanni Frova
by Steward & McKay
his attorneys

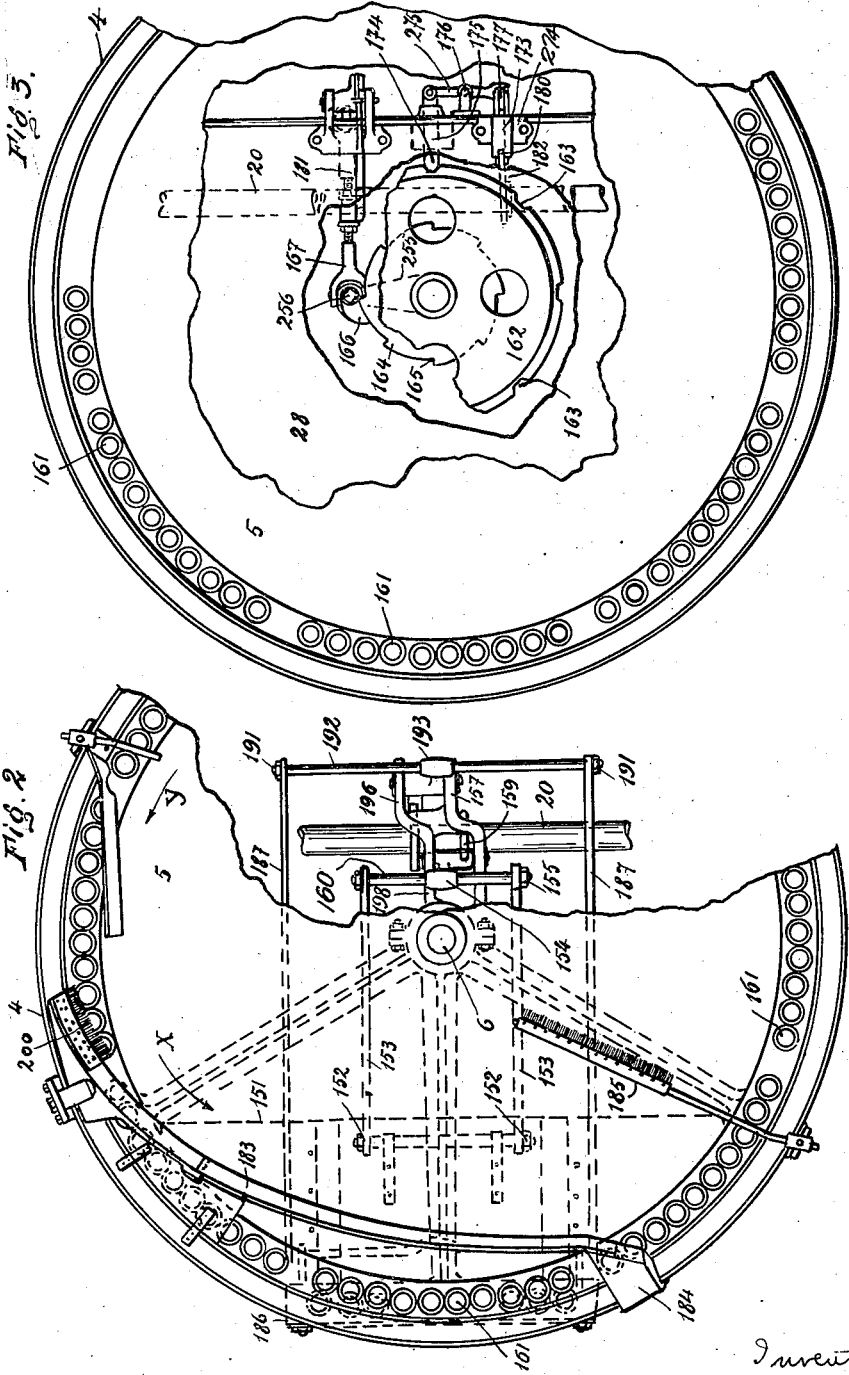

Jan. 8, 1929. 1,698,476
G. FROVA
FRUIT PITTING AND PEDUNCLE REMOVING MACHINE
Filed Dec. 20, 1926 4 Sheets-Sheet 3

Inventor
Giovanni Frova
by Stewart & McKay
his attorneys

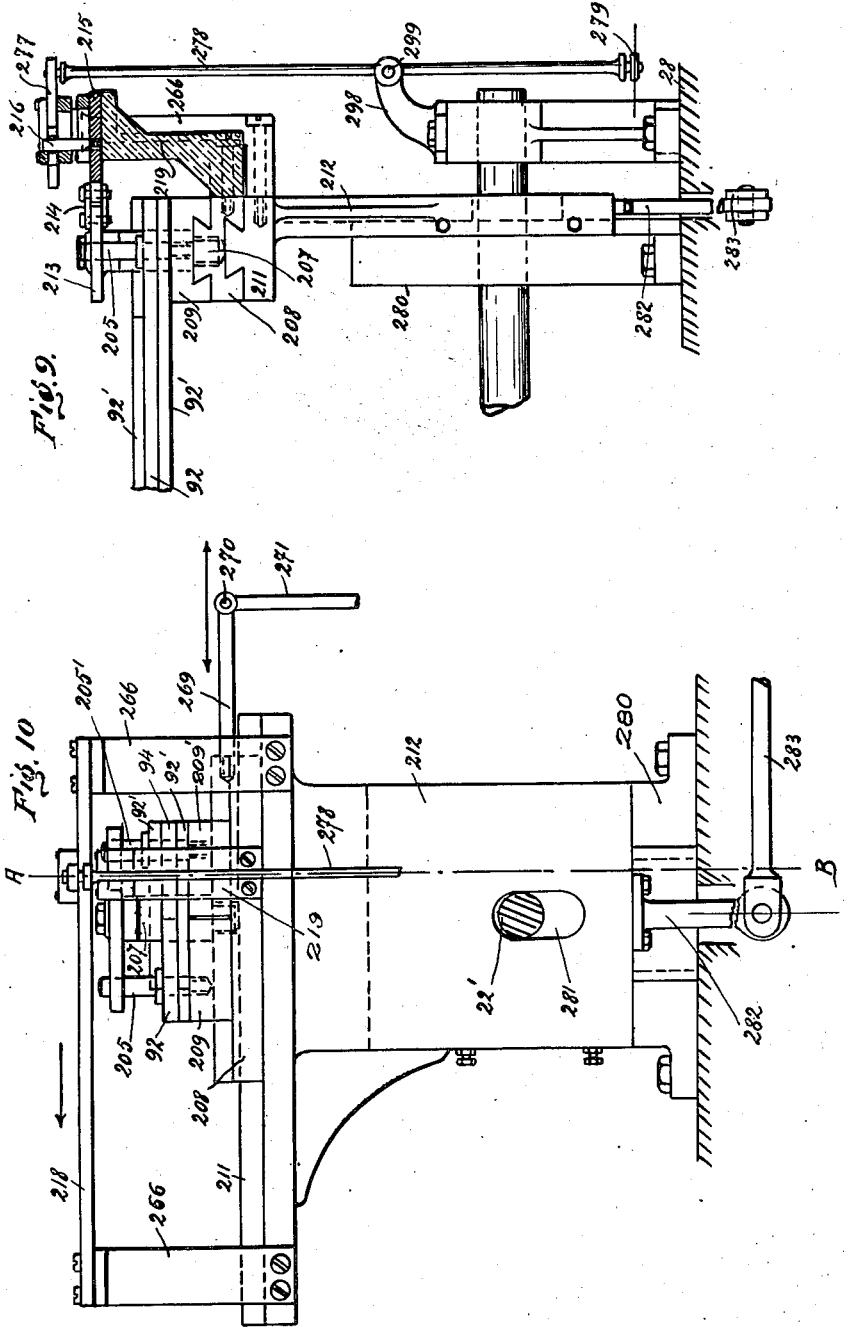

Patented Jan. 8, 1929.

1,698,476

UNITED STATES PATENT OFFICE.

GIOVANNI FROVA, OF MILAN, ITALY.

FRUIT-PITTING AND PEDUNCLE-REMOVING MACHINE.

Application filed December 20, 1926, Serial No. 156,021, and in Italy September 10, 1926.

These improvements are particularly applied to the machine forming the subject matter of my prior patent application dated January 25th, 1926, Serial No. 83,691.

Said improvements obtain for the machine:

(a) Means for distributing the fruit so improved as to secure that each of such fruits be brought one at a time before a gripping member.

(b) Means proper both to centre the fruits in such gripping members so as to bring the foot of the peduncle essentially on a vertical-line passing through the centre of the exit apertures of the feeding tubes bringing the fruits, so as to subsequently remove the peduncle or stem after the fruits have been firmly gripped.

(c) Means for imparting a slight shake to the pitted fruits when the gripping elements are open, so as to secure the exit of the former out of the latter.

(d) Means for cleaning the fruit-centering and stem or peduncle-extracting devices and for removing from the latter the extracted stems or peduncles.

(e) Means for expelling from the jaws of the pitting-device the pits which may eventually cling to the same.

The present invention is shown in one of its constructive forms and purely as an example in the accompanying drawings.

Fig. 1 shows a lateral view of the machine: some parts of it being drawn diagrammatically, other parts being cross-sectioned or even omitted in order to clearly illustrate the present improvements.

Fig. 2 is a fragmentary view from above and in a larger scale, showing partially in view and partially in broken lines, the parts above lines A—B—C—D—E of Fig. 1.

Fig. 3 shows a view similar to that of Fig. 2 but so cross-sectioned as to disclose the mechanism operating the intermittent rotation of the fruit distributing basin, such mechanism being placed under the base of the machine.

Figs. 7 and 8 show to a larger scale, sections on lines VII—VII, VIII—VIII of Figs. 5 and 6 respectively.

Fig. 9 shows to a larger scale than in Fig. 1 a front view, partially sectioned, of one of the mechanisms placed at both sides of the machine, controlling the fruit-centering and peduncle-extracting members.

Fig. 10 shows a side view of Fig. 9.

Fig. 11 shows a side view to a reduced scale of some parts of the machine including means for expelling from the pitting-jaws the pits which eventually may remain clinging to them; a constructional form of the means for giving to the pitted fruits a shaking, securing the fall of the same and means for cleaning the peduncle-extracting member.

Figure 4:
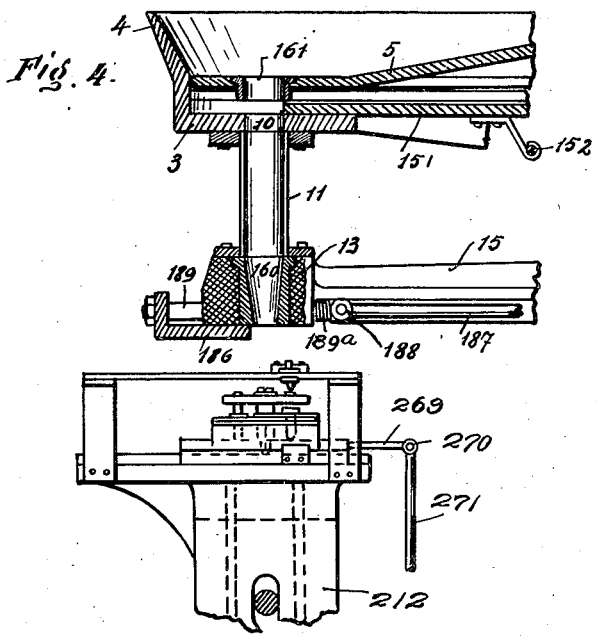
Fig. 4 shows in a larger scale and in vertical-middle cross-section a part of the fruit-distributing device.

With reference to Figs. 1 to 4, the annular fixed basin 3 (placed horizontally and provided with a rim 4 turned upward) differently from what has been specified and disclosed in patent application Serial No. 83,691, dated January 25th, 1926, is perfectly circular and in the front part of the machine is provided with a certain number of equal apertures 10, equally spaced and arranged along an arc concentric to its periphery. To apertures 10 are flange-fitted the upper ends of so many tubes 11 whose lower ends are flange-fitted each to a corresponding hole 160 (Fig. 4). All the holes 160 are cut in a cross bar or straight-transom 13 supported by arm 15 projecting from the upright tubular standard 1 fixed to the machine base 28 and in which is fitted rotating shaft 6. Also the annular basin 3 is supported by said standard 1, through radial arms or brackets 2. To the upper end of the operating shaft 6 is fixed, coaxially, a slightly conical rotating dish which moves in a somewhat higher plane over said annular basin 3. Said dish 5 is provided towards its rim with a series of holes 161 essentially of equal size of holes 10 in the basin and spaced as the latter. Besides, the centres of the holes 161 and those of holes 10 are at equal distances from the axis of shaft 6. The number of holes 161 of dish 5 will be an exact multiple of that of holes 10 of the annular basin 3.

To the conical dish 5 is imparted, during part of the rotation of the driving shaft of the machine, a certain angular shift embracing a given number of holes 161 equal to that of holes 10 of basin 3.

This is obtained by the following mechanism.

Shaft 6 in its lower part projects from the base 28 through a corresponding hole cut in the latter. (Figs. 1 and 3.) On said projection of shaft 6 is fixed a gear 164, provided with ratchet-teeth 165 equally spaced: the number of said teeth 165 is a multiple of the number of holes 161 of dish 5 with respect to holes 10 in basin 3. For instance if the number of holes 10 is ten, and the number of holes 161 is eighty, the ratchet-teeth will be eight in number.

A pawl 166 is pivoted at 256 on one of the ends of arm 255 and is kept pressed on the ratchet teeth 165 of wheel 164, for instance by means of a spring. The other end of the arm 255 is fitted loose on a shaft 6. The end of arm 255 to which the pawl is fitted is hinged to one of the ends of rod 167 of adjustable length. The other end of rod 167 is also hinged at 168 with one end of a swinging beam 169 fulcrumed at 170 on a bracket 257 projecting from base 28 of the machine. The other end of the beam 169 is hinged at 171 to one end of a slide 172 conveniently guided and capable of being shifted horizontally. The other end of the slide 172 is kept in contact by any convenient means, with a cam 181 (Fig. 3) keyed to the driving shaft 20 of the machine. When dish 5 has performed a rotation of the above stated angle, a blocking system retains it until the distribution of the fruits is completed first to the feeding tubes 10 and then to the gripping members 25 of drum 22.

Such a blocking system is designed and operates as follows:

On above said lower projection of shaft 6, is fixed also a circular disc 162 on whose rim are cut notches 163, equally spaced and in equal number to that of teeth 165 of the ratchet gear 164.

As soon as the latter has covered the proper fraction of a revolution, a bar bolt 174 (sliding horizontally in a bracket 175) moves forward and engages in one of the notches 163 of disc 162, the other end of the bar-bolt being hinged with one end of a beam 275 fulcrumed at 176, the other end of this beam is hinged to one end of a small lever 177 fulcrumed at 178 on a bracket 274, the other end of said lever is hinged at 179 with one of the ends of a sliding member 180 moving in bracket 173, the other end of the slider being constrained by any proper means to bear on the outline of a cam 182 keyed to driving shaft 20.

In order to prevent this device from being damaged through torsional stresses caused by the heavy mass of dish 5, the blocking mechanism could be applied directly to the dish 5 itself. In such a case disc 162 would be substituted by dish 5 which would then be provided on its rim with notches 163. The bar-bolt 174 would be placed so as to slide in a slot of rim 4 of annular basin 3 and in order to obtain the blocking action, means similar to the above described will be used and actuated by the driving shaft.

The device for distributing the fruit first to the holes 161 of dish 5 is the following:

On rim 4 (Fig. 2) of the annular basin 3 is placed a curved inclined bar 183 hinged at 184 in such a way as to be allowed to be lifted. The free end of this bar carries a brush 200. The lower edge of the cross-bar just grazes, without touching it, the upper surface of dish 5; and brush 200 operates so that the fruits placed in disorder on said plate and heaped above those that already have entered holes 161 will be prevented from passing under or in front of the cross bar 183, the same shifting aside the fruits in excess in the direction of the arrow X shown in Fig. 2, the basin revolving as shown by arrow Y.

Other side-shifting brushes 185 can be provided by hinging one end of each on said rim 4.

It has been already stated that dish 5 is somewhat spaced above basin 3 to the object of inserting between the latter and the former a sliding plate 151, conveniently guided, which, actuated in proper time, can with a reciprocating motion open or close the passage between said holes, thus allowing the single fruit to fall in each of the tubes 11.

Plate 151 is hinged at 152 to one end of a single or of several links 153, the other end of the same being connected together at 155 to a transverse rod 160.

In the middle of said rod 160 is pivoted one end of lever 154, fulcrumed at 156 on a proper bracket 157. The other end of lever 154 is provided with a follower roller 158 bearing on the outline of cam 159, keyed to driving shaft 20.

When, in determined working conditions of the machine, plate 151, under the control of cam 159, is moved towards the tubular standard 1, and the various holes 161 cut in dish 5, correspond or register exactly with the holes 10 in basin 3, the fruits in holes 161 will fall in the corresponding feed-tubes 11. As it may happen sometimes that some of the fruits remain stuck in the feed-tubes without reaching the bottom of the same, which fact would interrupt the regular performance of the machine, on the upper side of plate 5 can be placed flexible plungers or air nozzles conveniently directed, which (as soon as the plate 151 has moved, uncovering holes 161 and 10) drop into or direct a jet of air or other suitable fluid into the apertures, pushing the fruits right through said tubes.

In Fig. 1 are shown diagrammatically at N nozzles, placed above holes 161 and 10, for blowing a stream of air or water on said fruit so as to secure their fall through tubes 11 and their passage to the gripping members 25.

The fruits on arriving at the bottom of tubes 11 or in holes 160 of cross-bar 13 range themselves upright with the peduncles at the top, and rest on a sliding plate 186 (Figs. 1 and 4).

This plate may not be required if the above said plungers are used, the same pushing the fruit right to tubes 11 compelling them to fall in the gripping members 25 of drum 22.

Said plate 186 is secured to one end of each of sliding bars 189 conveniently guided, and the other ends of said bars are hinged at 188 to ends of rods 187. The other ends of rods 187 are connected to cross-bar 192 (Figs. 1 and 2). In the middle of the latter is hinged at 193 one end of lever 194 fulcrumed at 195 on bracket 196: the other end of said lever carries a follower-roller 197 bearing on the profile of cam 198 keyed to the driving shaft 20.

Compressed springs 189ª retain yieldingly plate 186 in such a position as to cover holes 160.

When cam 198 moves, plate 186 is shifted in the position shown in Fig. 4 and the fruits will be free to fall upright with their peduncles or stems at the top to the gripping jaws 25.

Between drum 22 and plate 186 (or failing the latter, the lower side of cross bar 13 in which are cut holes 160) is placed a mechanism capable of first centering the fruits in said gripping jaws 25, carrying the roots of their peduncles on the vertical-line passing along the axis of feed-tubes 11, and subsequently after the closing of jaws 25 capable of extracting the peduncles. Such a mechanism is shown in Figs. 1 and 4 to 10.

Every centering and stem or peduncle-extracting member is composed of two parts 92 and 92′. Part 92 is formed by a long plate or blade, whilst part 92′ is formed of two small blades similar to 92 kept apart by a small distance piece 94, whose breadth is slightly greater than the thickness of blade 92, so as to allow the latter to insert itself between blades 92′. The edges of blades 92 and 92′ (Figs. 5 to 8) facing each other, are provided with triangular notches 93 and 93′ respectively, whose points, when the device is in its rest position (Figs. 5 and 7) fall essentially in a vertical plane passing through the centres of holes 160 of cross-bar 13, so as to form openings through which the fruits can pass falling between the jaws 25 of drum 22. When on the contrary said points are brought close together with equal velocity of shift so as to bring them in the working position shown in Figs. 6 and 8, said openings will gradually reduce to a very small value, in which case they grip the fruit stems or peduncles projecting from the jaws 25. During gradual shift of blades 92 and 92′, first a centering of the fruits in said jaws 25 not yet fully closed is being performed by acting on the stem or peduncle of the fruit: at the end of the stroke of said blades said peduncle is gripped and on lifting said blades 92—92′ (whilst they are closed) the stem or peduncle is extracted.

Between the elements of the double blade 92′ is inserted a small flat bar 201 connected to two or more sliding pins 202 (Figs. 5 and 6) on whose free ends are screwed nuts and set-nuts 203. Said pins 202 go through the spacing piece 94 of the two elements and a guiding thimble 265 serving also as a stop piece fixed to the outer edge of part 92′. A retractile spring 204 is placed on each pin 202 between bar 201 and spacing piece 94.

When the two parts 92 and 92′ are in the closed position or pushed together, bar 201 is pushed back by part 92 against spring 204 towards the spacing member 94 of parts 92′. When on the contrary blades 92 and 92′ are opened or moved apart (position shown in Fig. 5) the spring 204 will act on bar 201 and push it in the position shown in the above said figure in which they disengage such peduncles as may have remained sticking or wedged in notches 93′.

The reciprocating shift of blades 92—92′ is obtained with the following device:

At both sides of the machine, symmetrical to shaft 22′ of drum 22 are fitted two vertical plates 212 shifting with reciprocating motion in a vertical plane on convenient standard bearings 280, rising from the base of the machine; such vertical plates being provided with vertical oblong slots 281 allowing shaft 22′ to go through them and allowing also their own reciprocating vertical shift. Each upper-end or top of each plate 212 carries the following members of which a single set is hereafter described.

Adjacent the top of each plate 212 are fixed two brackets 266 on the upper part of which is secured plate 218: on the top of plate 212 is fitted table 211 on which slides longitudinally the sliding-rest 208.

On said sliding-rest are fitted also in a manner allowing a longitudinal shift, two small blocks 209—209′ to which are secured the ends of blades 92 and 92′ respectively. From sliding rest 208, between blocks 209—209′, rises a pin 207 on which is pivoted plate 213 in which are cut two curved eccentric slots, diametrally opposed, 206—206′, in which engage two pins 205—205′ respectively rising from the ends of blades 92 and 92′.

One of the ends of plate 213 is hinged (Figs. 5 and 6) to one end of links 214 whose other end is hinged to a runner 215 conveniently guided in a bracket 219 fixed to sliding rest 208, the runner 215 has the object of alternatively sliding transversely to the machine in bracket 219.

It is evident that on shifting runner 215 from the inside towards the outside of the machine plate 213 will be caused to oscillate.

Figure 5:
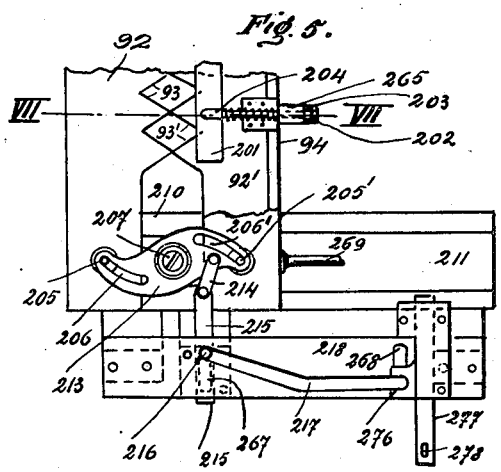
Figs. 5 and 6 show to a larger scale a view from above one of the ends of the fruit-centering and peduncle-extracting device, in its rest position and working position respectively.
Figure 6:
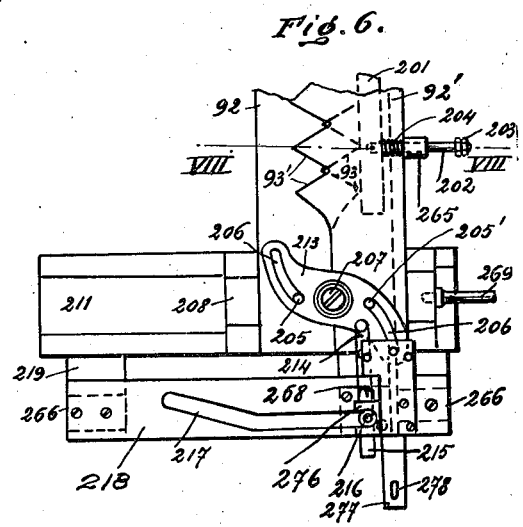

During this oscillation, slots 206—206′ will constrain the pins 205—205′ to draw near to each other and, as the same are fixed to blades 92—92', the latter will draw near at the end of the rotational stroke from position shown in Fig. 5 to that shown in Fig. 6.

The mechanism for obtaining such shift will be described hereafter.

From the lower extremity of each of said side-plates 212 projects tail-rod 282 to whose free end is connected through a pin joint, having a certain amount of play, one end of a swinging-beam 283 conveniently fulcrumed at 284 on a bracket 285.

The other end of beam 283 is hinged at 286 with a certain play, to the lower end of rod 287 having a vertical shift and conveniently guided, whose upper end carries a roller, bearing on the periphery of a proper cam keyed to the driving shaft 20. Such a mechanism is placed at each side of the machine.

When the cams act in a way to lower rods 287, the same move swinging-beams 283 causing plates 212 to rise, thus lifting all the members fitted on them and consequently also blades 92—92'. In this way the latter extract the peduncles from the fruits retained in the gripping-jaws of drum 22.

At this moment the following device begins to operate with the object of shifting as a whole all the members sliding on table 211. To obtain this, from the back top of slide rests 208, project rods 269 each pivoted at 270 to the upper end of a swinging beam 271 fulcrumed at 272 on a bracket rising from the base of the machine. The other end of said beam 271 is hinged at 274 with one of the ends of the adjustable rod 275 whose other end is hinged with a mechanism (not shown in the drawing, being obviously simple) formed by a swinging-beam of which one end is hinged to the last named end of said adjustable rod 275, whilst the opposite end of said swinging-beam bears on a cam keyed to the driving shaft 20.

It follows evidently that said cams will impart at certain times, through the above described mechanisms, a reciprocating motion to the slide rests, which will bring blades 92 and 92' alternatively under the tubes and towards the front part of the machine in which latter position they will arrive open so as to allow the extracted peduncles to fall out.

In such a case, viz, in the position of greatest forward stroke, one or more rotating brushes will be arranged for cleaning blades 92 and 92' and taking away the peduncles yet sticking to the same.

It is obvious that in such a case brushes 252 fitted on drum 22, of which mention will be made further on, can be dispensed with.

The mechanism for imparting the reciprocating motion to the runners 215 is the following:

From the upper face of each runner 215 rises a pin 216 going through and projecting out of the oblong slot 217 cut in plate 218 and sliding cross-ways in a cross-slot 268 cut in bracket 219. Slot 217 (Figs. 5 and 6) follows substantially a broken line, viz, runs parallel towards the back-side, inclining inwardly towards the front side. At the back end of slot 217 is a small cross-slot 268. A second runner 277 is fitted so as to slide transversely to plate 218 and carries a fork 276. Said runner is parallel to runner 215 above described. The outward end of the former runner 277 is hinged to one end of swinging beam 278 fulcrumed at 299 on a bracket 298 (Fig. 9). The other end of said swinging beam 278 is hinged to one end of another similar beam 279 fulcrumed at 297 and moving horizontally. The other end of said beam being always maintained bearing with any proper means, upon the periphery of a cup-like cam keyed to the driving shaft 20.

When the slide-rests 208 are moved forward (Fig. 5) the pins 216 guided by slots 217 will shift the runners 215 so as to obtain the opening of blades 92—92'. When on the contrary the slide-rests are moved backward, during the whole period in which the pins move in the parallel part of slot 217, the blades 92—92' will be closed. At the end of the backward motion, pins 216 will be caught by forks 276 of the other runners 277 and from that moment the mechanism controlling the latter will enter into play and pins 216 will be constrained to follow the cross-slots 268 of plates 218 thus opening again blades 92—92' allowing the fruit to fall through into the gripping elements. Thereupon the two runners 215 and 277 will be again shifted in position shown in Fig. 6. The fruit centering and peduncle extracting operation will follow, the lifting mechanism of the lateral plates 212 entering into play, and the slide-rest 208, being moved forward, blades 92—92' will consequently open at the end of the stroke allowing the extracted peduncles to fall off.

It is clear that other means for controlling the single elements of the machine, different from the above described and illustrated, may be used within the limits of the appended claims.

The means for securing the expulsion of the fruit pits from the extracting nippers 39 (Fig. 11) are the following:

At the sides of the slide 36 carrying said nippers, rise from the base 28 of the machine two brackets 230 to which is pivoted at 238 a cross-bar (not seen in the drawing) from which project one or more arms 237 whose free ends are hinged to one end of one or more links 236. The other ends of links 236 are pivotally connected to one end of one or more levers 231, fulcrumed at 232 on a proper bracket rising from the base 28. The other end of said lever or levers 231 carries a follower-roller 233 bearing on corresponding cams 235 all alike, keyed to the driving shaft 20. One or more springs 234 normally hold the lever or levers 231 in the position shown in Fig. 11.

On the cross-bar pivoted at 238 are fixed brushes 239 oscillated by said cams so as to enter in nippers 39, wiping away the pits that eventually remain sticking to the same.

In order to prevent the pitted fruits from remaining between the gripping-jaws 25 after their being opened, the following device has been designed (Fig. 11):

On a bracket 240 hanging under the base plate 28 of the machine, are fixed two standards 241 (one on each side of drum 22), provided with a vertical slot 242, in which move the ends of a horizontal cross-bar 243 carrying a set of vertical brushes, equally spaced, each brush corresponding to a gripping jaw 25. At the ends of said cross-bar 243 engages the fork-shaped end of a lever 245, conveniently fulcrumed at 246 on a proper bracket, whose other end bears on cam 247 keyed to shaft 248 mounted on a standard 248' and driven by a chain gear 249—250 and chain 251 by shaft 20 at the same speed as the latter. Cam 247 imparts to said lever an oscillating motion during which the brushes 244 are brought in touch with the fruits which may remain between the open jaws 25, compelling them to fall in a tray underneath. Eventually the brushes could be replaced by pipes or nozzles from which a stream of water or air could be directed on the fruits compelling them to fall out. Levers 295 could be used as control members for opening or cutting out said jets.

The means for cleaning the fruit centering and peduncle extracting members 92—92' comprises brushes 252 (Figs. 11 and 12) mounted fixed or rotating between the end walls of drum 22 and placed between two contiguous sets of fruit gripping members. In such a case, drum 22 is not provided with the curved protective sheets 28' as described in prior patent application dated January 25th, 1926, Serial No. 83,691.

The brushes 252 in passing under blades 92—92' (when the machine is not provided with the device to shift the same) operate to clean them, brushing away the peduncles that eventually may yet remain clinging to them. Another fixed brush 254 is used to clean the moving brushes 252 when they come in touch with the same.

It is clear that in giving to the various cams and eccentrics, keyed to the main shaft, a proper form to obtain the desired motions and by arranging the eccentrics in proper relation one to another so as to act at the right moment, in one single revolution of the main driving shaft of the machine, the control of all its working members will be secured at the right time and in proper succession.

Having now particularly described and ascertained the nature of my said invention and in what manner the same is to be performed, I declare that what I claim is:—

1. In a fruit pitting machine, means for receiving the fruit to be pitted comprising a rotatable member on which are thrown in heaps fruit to be pitted, said rotatable member being formed to provide means for arranging the fruit in groups in a predetermined order, said member being further provided with means for separating said groups in definite relationship to each other.

2. In a fruit pitting machine, the combination, with means for holding fruit to be pitted, of means for receiving the fruit to be pitted, and means for conveying fruit from such receiving means to such holding means, such receiving means including a rotatable conical member provided with means adapted to arrange fruit in a predetermined order and to deliver it to such conveyor means.

3. In a fruit pitting machine, the combination, with means for holding fruit to be pitted, of means for receiving fruit to be pitted, and means for conveying fruit from such receiving means to such holding means, such receiving means including a rotatable conical member provided with apertures adapted to receive and arrange fruit in a predetermined order and to deliver the fruit so arranged to such conveyor means.

4. In a fruit pitting machine, the combination, with means for holding the fruit to be pitted and means for conveying fruit to such holding means, of means for receiving the fruit to be pitted, said means including a rotatable member adapted to deliver one fruit at a time to such conveyor means, and valve means controlling such delivery.

5. In a fruit pitting machine, in combination, pit removing mechanism, and means for distributing the fruit to be pitted so as to convey it one at a time to the pitting mechanism, including a revolving dish on which are thrown in heaps the fruits to be pitted, said dish being provided with a plurality of apertures adapted to receive fruit, a plurality of tubes adapted to convey fruit from said dish to said pit removing mechanism, and means for causing certain of said apertures to register with said tubes.

6. In a fruit pitting machine, in combination, pit removing mechanism, and means for distributing the fruit to be pitted so as to convey it one at a time to the pitting mechanism, including a revolving dish on which are thrown in heaps the fruits to be pitted, said dish being provided with a plurality of apertures adapted to receive fruit, a plurality of tubes adapted to convey fruit from said dish to said pit removing mechanism, valve means normally closing said tubes, means for moving said dish to cause said apertures to intermittently register with said tubes, and means for operating said valve mechanism to open said tubes to permit fruit to enter the same.

7. A fruit pitting machine as claimed in claim 3 further characterized by means for cleaning out and assisting fruit to pass through such conveyor means.

8. In a fruit pitting machine, the combination, with fruit holding means, of means for feeding the fruit thereto in predetermined position, and means comprising members adapted to engage and shift the position of the stems of the fruit, said members movable to grip and to pull the stems from the fruit.

9. In a fruit pitting machine, fruit gripping devices, means for conveying fruit thereto, and means located between such conveyor means and said gripping devices for centering the fruit in said gripping devices and for removing the stems, such last mentioned means comprising a plurality of plates provided with angular notches symmetrically arranged in their facing edges, means for moving said plates together to grip the stems of the fruit between said notches and means for moving said plates, while gripping the stems, away from the fruit while said fruit is held in said gripping devices to thereby move said stems.

10. A fruit pitting machine as claimed in claim 9 further characterized by means for clearing the plates of adhering stems.

11. In a fruit pitting machine, fruit gripping devices, means for delivering fruit to be pitted thereto and means located between said devices and such fruit delivering means comprising a plurality of plates provided with opposed notched edges movable toward and away from each other and from the fruit held in said fruit gripping devices, the fruit from such delivery means passing between said plates into said gripping devices, means for moving said plates together after the fruit has passed therethrough to cause said plates to engage and grip the stems and center the fruit in said gripping devices, means for moving the plates away from the fruit while gripping the stems thereof to remove said stems from the fruit, and means for causing the plates to open and release said stems.

12. In a fruit pitting mechanism, means forming a packet for holding the fruit while it is being pitted, and means comprising a reciprocating member for removing from such fruit holding means fruit which may remain after the pitting operation, said reciprocating member entering and removing such remaining fruit from one side of said pocket.

13. In a fruit pitting mechanism, means for grasping and removing pits from fruit and means comprising an oscillating brush for removing from such pit grasping and withdrawing means any pits which may remain after the pitting operation.

14. In a fruit pitting machine, in combination, pitting means, means for holding the fruit to be pitted and means movable away from the fruit to pull the stem from the fruit while it is held in such fruit holding means.

15. In a fruit pitting machine, the combination, with fruit holding means, of means for feeding the fruit thereto in predetermined position, and means comprising cooperating members movable towards each other and adapted to shift the position of the fruit to cause the stems thereof to assume a predetermined position.

16. In a fruit pitting machine, the combination, with fruit receiving means, of means for feeding the fruit thereto in predetermined position, and means comprising cooperating members movable towards each other and adapted to engage and shift the position of the fruit stems, said cooperating members also operating to remove the stems from the fruit.

17. A structure as set forth in claim 16, in which the cooperating members comprise two spaced plates with a relatively movable plate operating therebetween.

18. A fruit pitting machine comprising means for holding fruit to be pitted, means for feeding fruit thereto in predetermined position, and means for positioning the fruit in the fruit holding means.

19. A fruit pitting machine comprising means for holding fruit to be pitted, means for feeding fruit thereto in predetermined position, and means for positioning the fruit in the fruit holding means, the holding means loosely supporting the fruit until it is finally positioned therein, the said holding means clamping the fruit after said final positioning.

20. A fruit pitting machine comprising a rotatable drum carrying fruit holding receptacles thereon, means for feeding fruit in predetermined position to the holding means, and means synchronized with the rotation of the drum for removing the stems from the fruit.

21. A fruit pitting machine comprising a rotatable drum carrying fruit holding receptacles, means for feeding fruit in predetermined position to the holding receptacles, and means synchronized with the rotation of the drum for permitting a fruit to pass into each holding receptacle, while thereafter positioning the fruit in said receptacle and removing the stem from the fruit.

Signed at Milan (Italy), this 30th day of November, 1926.

GIOVANNI FROVA.